United States Patent [19]

Funabashi et al.

[11] Patent Number: 4,786,997
[45] Date of Patent: Nov. 22, 1988

[54] DISK CLAMPING MECHANISM FOR A DISK PLAYER

[75] Inventors: Tadashi Funabashi; Kenji Tanaka, both of Saitama, Japan

[73] Assignee: Pioneer Electronic Corporation, Tokyo, Japan

[21] Appl. No.: 780,110

[22] Filed: Sep. 25, 1985

[30] Foreign Application Priority Data

Sep. 25, 1984 [JP] Japan .................. 59-144704[U]
Sep. 25, 1984 [JP] Japan .................. 59-144705[U]
Sep. 25, 1984 [JP] Japan .................. 59-144706[U]
Sep. 25, 1984 [JP] Japan .................. 59-144707[U]

[51] Int. Cl.$^4$ ............................................ G11B 5/012
[52] U.S. Cl. ................................. 360/97; 369/270
[58] Field of Search ............... 360/97, 99, 86, 137; 369/270–271

[56] References Cited

U.S. PATENT DOCUMENTS

| 4,502,136 | 2/1985 | Rickert et al. | 369/271 |
| 4,514,839 | 4/1985 | Eisemann | 369/270 |
| 4,539,614 | 9/1985 | Thompson | 360/99 |
| 4,541,086 | 9/1985 | Tanaka | 369/271 |
| 4,570,256 | 2/1986 | Tamaru | 369/271 |
| 4,577,248 | 3/1986 | Cantwell | 360/99 X |
| 4,592,040 | 5/1986 | Ohsaki | 369/270 X |

FOREIGN PATENT DOCUMENTS 114166 9/1981 Japan .................. 369/270

Primary Examiner—Stuart N. Hecker
Assistant Examiner—David J. Severin
Attorney, Agent, or Firm—Sughrue, Mion, Zinn, Macpeak, and Seas

[57] ABSTRACT

A disk clamping mechanism for a disk player in which centering of a supporting member on a pressing member which performs a pressing operation in cooperation with a turntable is performed accurately and inexpensively. A spherical bearing member is placed in a tapered portion which is at the center of the pressing member, and contacts a bearing reception member on a lower surface of a lift member which lifts the pressing member off a disk when the disk is not being played. The pressing member is balanced on a turntable by means of a protrusion formed in a lower surface of the pressing member at its rotational center, the protrusion fitting into a corresponding recess in the rotational center of the turntable.

8 Claims, 4 Drawing Sheets 4,786,997

DISK CLAMPING MECHANISM FOR A DISK PLAYER

BACKGROUND OF THE INVENTION

The present invention relates to a disk clamping mechanism for a disk player including a pressing member for performing a disk clamping operation in cooperation with a turntable.

Basically, a clamping mechanism for pressing a disk against a turntable during playing is provided with a pressing member rotated with said turntable for performing a disk clamping operation in cooperation with a turntable, and a supporting mechanism for rotatably supporting the pressing member. The respective rotary centers of the turntable and the pressing member are made to coincide with each other when the disk is pressed against the turntable. In the clamping mechanism which has been proposed in the prior art, a mechanism for performing the centering operation is arranged such that a miniature bearing is attached on a rotary spindle of the pressing member and the spindle with the miniature bearing is slidably attached on a predetermined supporting member. The resulting mechanism is complicated and expensive.

SUMMARY OF THE INVENTION

Accordingly, an object of the present invention is to provide a disk driving mechanism which is inexpensive and which is provided with a clamping mechanism capable of performing an accurate centering operation.

According to the present invention, the disk driving mechanism comprises: a turntable for rotating a disk to be played, and having a recess formed in an upper surface thereof, at its rotational center; a pressing member, for clamping the disk in cooperation with the turntable, and having a projection extending from a lower surface thereof, at its rotational center, the projection fitting into the recess; a spherical bearing member which contacts the rotational center of the pressing member on an upper surface thereof; an annular holding member fitted around the bearing member such that an upper end portion of the bearing member projects out of the holding member so as to fix the bearing member onto the pressing member; and supporting means for rotatably supporting the pressing member, the supporting member having a surface which contacts the upper end portion of the bearing member, the pressing member having a tapered portion formed at a position where the bearing member contacts the pressing member, the tapered portion conforming to the surface of the bearing member.

BRIEF DESCRIPTION OF THE DRAWINGS

The invention will be described below in detail with reference to the accompanying drawings, in which.

DETAILED DESCRIPTION OF A PREFERRED EMBODIMENT

Figure 1:
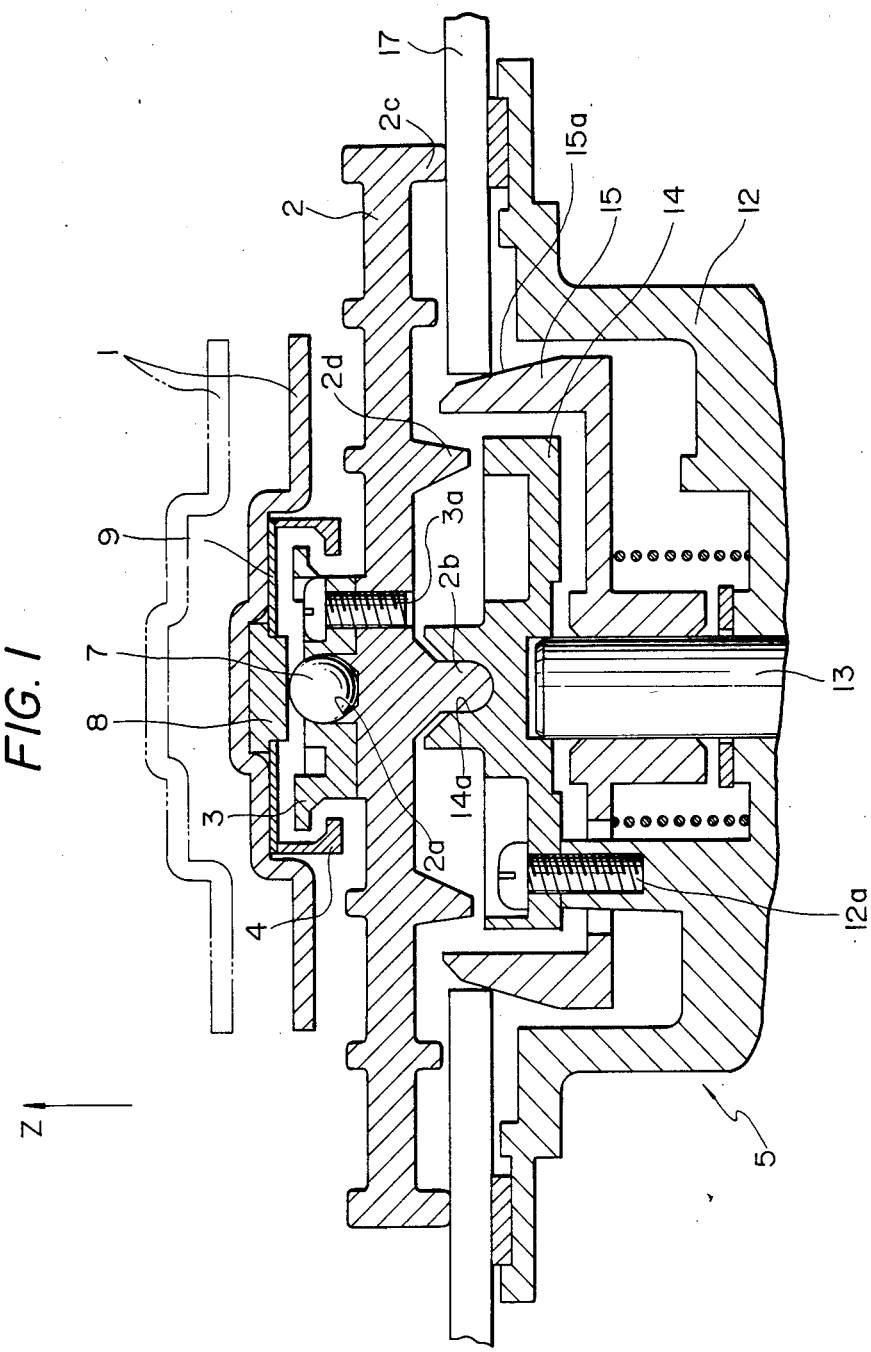
FIG. 1 is a sectional view of a disk driving mechanism according to the present invention, as used in positioning a video disk.
Figure 2:
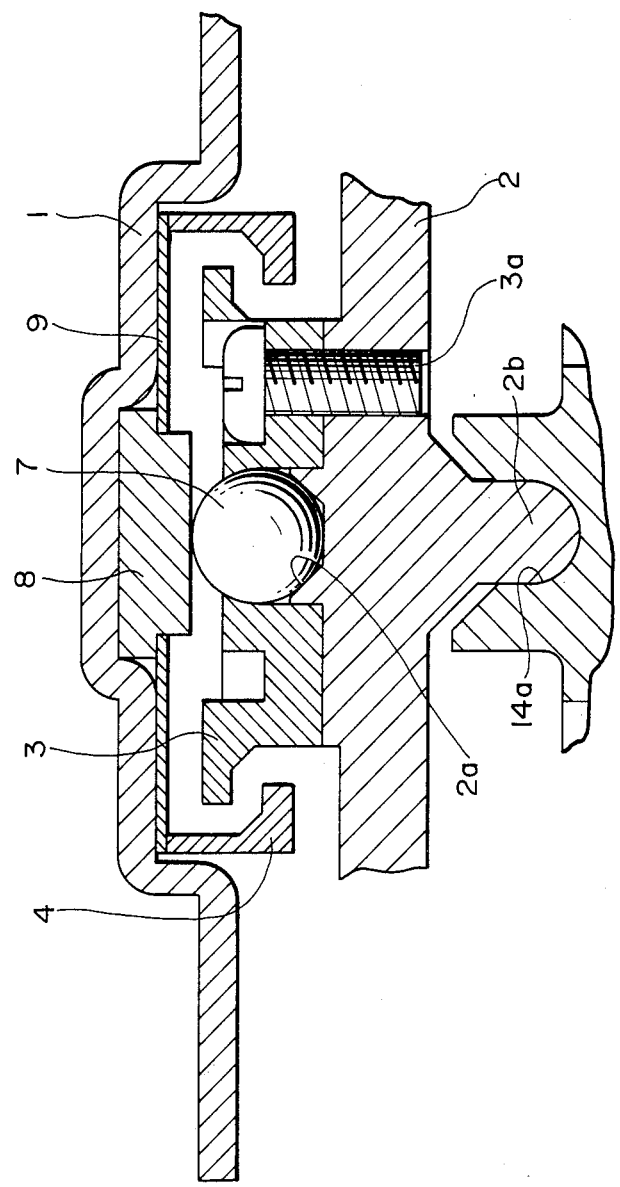
FIG. 2 is a more detailed sectional view of the supporting body 1, the pressing member 2, and associated components shown in FIG. 1.

As shown in FIG. 1, a supporting body 1 is provided movably in a vertical direction along an axis indicated by the arrow Z. The positions shown by a solid line and a two-dotted chain line are respectively referred to as a clamping and a non-clamping position of the supporting body. The supporting body 1 travels between the clamping position and the non-clamping position. As shown in FIG. 2, a disk-like lift member 4 for rotatably supporting a pressing member 2 through a holding member 3 is fixed on the lower surface of the supporting body 1. The pressing member 2 and a turntable 5 clamp a disk between them during operation of the disk player.

A spherical bearing member 7 contacts an upper surface of the pressing member 2, which is opposite a lower, disk-pressing surface of the pressing member, for pressing a disk, at its rotational center. The holding member 3, for holding the bearing member onto the pressing member 2, is annular in shape and is fitted around the bearing 7 so that the upper portion of the bearing member 7 projects out of the holding member 3, and is connected to the pressing member 2 by screws 3a. The annular holding member 3 may be made to contact only the upper half of the spherical bearing member 7, in order to achieve more accurate centering of the spherical bearing member on the pressing member 2.

A tapered portion 2a is formed at the center of the pressing member 2 and contacts the bearing member 7, so that the diameter of tapered portion decreases from the upper surface of the pressing member toward the disk pressing surface of the pressing member. Because of this tapered portion 2a, the spherical bearing member 7 is accurately guided to the rotary center of the pressing member 2 when the spherical bearing member 7 contacts the pressing member 2.

As is apparent especially from FIG. 2, the holding member 3 is formed such that the inner peripheral surface thereof engages only with the upper half portion of the spherical bearing member 7.

A bearing reception member 8 is also provided on the lower surface of the supporting body 1, one surface of the member 8 facing the upper surface of the pressing member 2 and contacting the upper end portion of the bearing member 7. The bearing reception member 8 is made of resin or the like, is shaped substantially in a disk-like form, and is held between the supporting body 1 and an attachment plate 9 attached to the lower surface of the supporting body 1 by double-face adhesive tape or the like.

Figure 3:
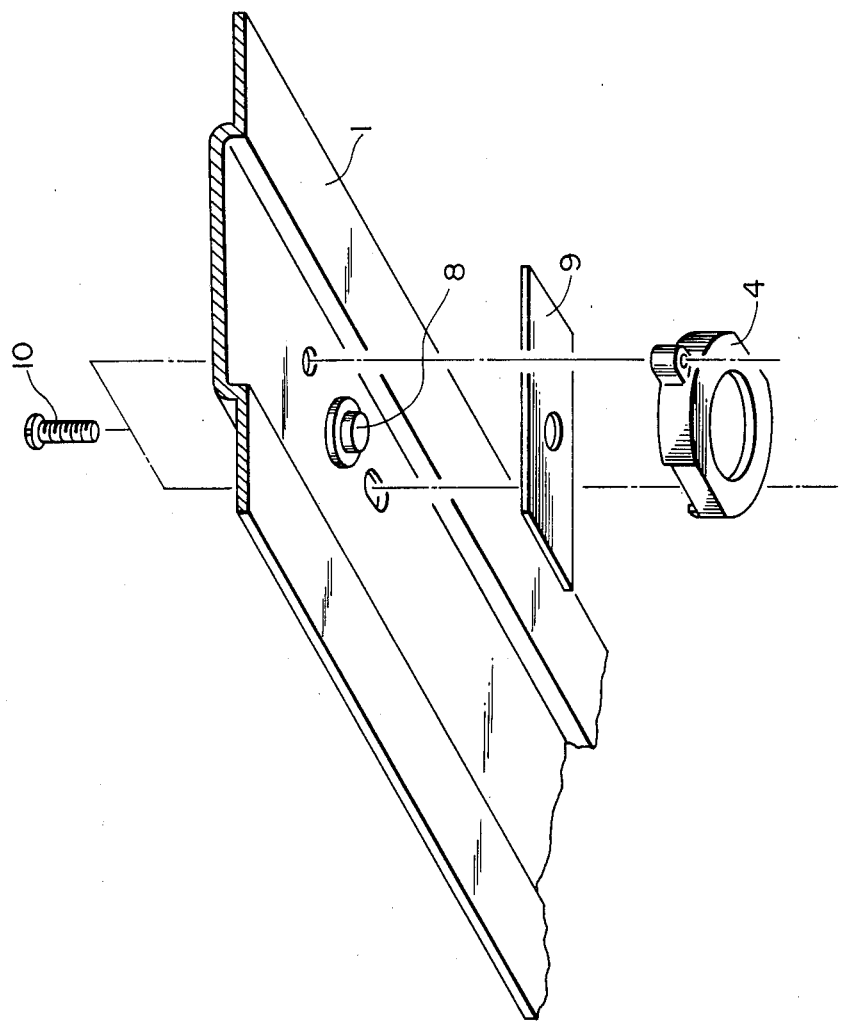
FIG. 3 is an exploded view of a supporting member used in the present invention.

As apparent especially from FIG. 3, the lift member 4 is disposed so as to sandwich the attachment plate 9 between the supporting body 1 and the lift member 4, and fixed on the supporting body 1 by screws 10. That is, the attachment plate 9 and the bearing reception member 8 are attached to the lower surface of the supporting body 1 by fastening the screws 10. As a result, the supporting body 1, the lift member 4, the bearing reception member 8, and the attachment plate 9 together rotatably support the pressing member 2. The pressing member 2 and its abovedescribed rotatable support, the holding member 3, and the spherical bearing member 7 together constitute a clamping mechanism.

At the rotational center of the turntable 5, there is provided a center table 14 which is fitted onto the upper portion of an output shaft 13 of a spindle motor (not shown). The center table 14 is connected to a turntable body 12 by screws 12a. The turntable body 12 is fitted on a lower portion of the output shaft 13 below the center table 14. A centering hub 15 is slidably inserted onto the output shaft 13 between the table 14 and the body 12. The centering hub 15 is generally cup-shaped, so that the center table 14 fits into the cup portion. At the upper end portion of the outer periphery of the centering hub 15 is a tapered portion 15a fitted in a center hole of a disk 17 for positioning the disk. The disk 17 in FIG. 1 is an optical video disk having an outer diameter of about 30 cm.

A projecting portion 2b is formed on the disk pressing surface of the pressing member at its rotational center, and is fitted into a recess portion 14a which is formed at the rotational center of the center table 14.

Figure 4:
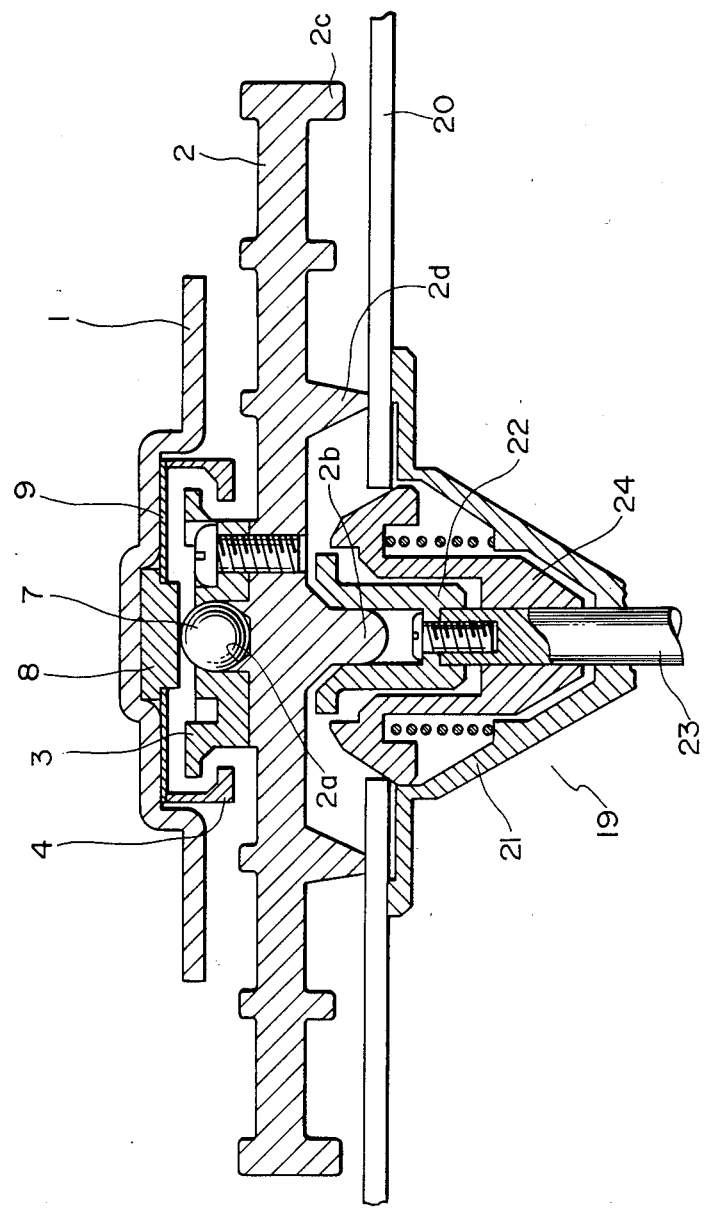
FIG. 4 is a sectional view of a disk driving mechanism according to the present invention, as used in positioning a compact disk.

The disk driving mechanism of the present invention can drive not only the optical video disk 17 having an outer diameter of about 30 cm, as shown in FIG. 1, but also a compact disk 20 having an outer diameter of about 12 cm by using a compact turntable 19 provided in the disk driving mechanism, as shown in FIG. 4. Similarly to the turntable 5, the turntable 19 is provided with the a turntable body 21 and a center table 22 which are fitted onto an output shaft 23 of a spindle motor (not shown) which carries the turntable body 21. A centering hub 24 is provided between the turntable body 21 and the center table 22 and is slidably fitted on the output shaft 23. Moreover, though not shown in the drawing, there is provided a mechanism for conveying the turntable 5 or the turntable 19 to a position directly below the pressing member 2, in accordance with the diameter of a disk to be played. Such a conveying mechanism has been proposed by the present applicant, for example, in Japanese Utility Model Application No. 159078/1983.

Annular pressing protrusions 2c and 2d for respectively pressing the main surfaces of the disk 17 and the compact disk 20 are respectively provided on the outer and the inner peripheral portion on the disk pressing surface of the pressing member 2. The inner protrusion 2d can contact the upper surface of the inner peripheral portion of the turntable 5.

When the disk player is transported, the pressing member 2 and the turntable 5 directly contact each other strongly. The foregoing inner annular pressing protrusion 2d contacts the center table 14 of the turntable 5 to prevent deformation of the pressing member 2. Such deformation can occur, for example, during transportation under high temperature conditions.

In the disk driving mechanism according to the present invention, as described above in detail, the mechanism for making the respective rotary centers of the turntable and the pressing member of a clamping mechanism coincide with each other is constituted, substantially in a very simple manner, by a spherical bearing member and a holding member for holding the bearing member onto the pressing member and the like. Moreover, these members are inexpensive and are readily available, resulting in lower cost.

A tapered portion contacts the spherical bearing member and conforms to its shape. As a result, the spherical bearing member is guided to the rotational center of the pressing member when the spherical bearing member is brought into contact with the pressing member, so that the respective central axes of the spherical bearing member and the pressing member coincide precisely. Consequently, the pressing member and the turntable are centered accurately.

Because of the tapered portion, the pressing member and the spherical bearing member contact each other along an annular line, so that the respective contacting portion of each of the spherical bearing member and the pressing member hardly deform or wear out even if the clamping force is quite strong, so that centering can be performed more accurately.

We claim:

1. In a disk-driving mechanism including a turntable for rotating a disk to be played, a clamping mechanism comprising:

a pressing member, for clamping said disk in cooperation with said turntable, and having a projection extending from a lower surface thereof at its rotational center, said turntable having a recess formed in an upper surface thereof, at its respective rotational center, said projection fitting into said recess, said pressing member further having an outer annular pressing protrusion, extending from the side of said pressing member facing said disk, for pressing a main surface of said disk, and an inner annular pressing protrusion, extending in the same direction as said outer annular pressing protrusion;

a spherical bearing member which contacts the rotational center of said pressing member on an upper surface thereof;

an annular holding member fitted around said spherical bearing member, an upper end portion of said spherical bearing member projecting out of said holding member so as to fix said spherical bearing member onto said pressing member;

supporting means for rotatably supporting said pressing member, said supporting means having a surface which faces the upper surface of said pressing member and which contacts said upper end portion of said spherical bearing member, said pressing member having a tapered portion formed at a contact point between said spherical bearing member and said pressing member, said tapered portion conforming to the surface of said spherical bearing member;

a spindle passing through the rotational center of said turntable; and a centering hub having a rotational center through which said spindle also passes, said centering hub accommodating at least one of a first disk having a center hole of a first diameter and a second disk having a center hold of a second diameter smaller than said first diameter, wherein said outer annular pressing protrusion clamps said first disk and said inner annular pressing protrusion clamps said second disk.

2. A clamping mechanism as claimed in claim 1, wherein said centering hub includes a tapered portion over which said center holes fit.

3. A clamping mechanism as claimed in claim 1, further including biasing means for biasing said centering hub toward said pressing member.

4. A clamping mechanism as claimed in claim 1, wherein said supporting means comprises:

a lift member which cooperates with said holding member, so as to rotatably support said pressing member;

a supporting body attached to a surface of said lift member which faces away from the upper surface of said pressing member; and a bearing reception member having an upper surface which contacts a lower surface of said supporting body, and a lower surface which contacts said spherical bearing member.

5. A clamping mechanism as claimed in claim 4, wherein an inner peripheral surface of said annular holding member contacts only an upper half portion of said spherical bearing member.

6. A clamping mechanism as claimed in claim 4, wherein said supporting body further comprises an attachment plate, attached to said lower surface of said supporting body, for holding said bearing reception member in place, said attachment plate being positioned between said supporting body and said lift member.

7. A clamping mechanism as claimed in claim 6, wherein said attachment plate is fitted onto said supporting body by at least one screw, said attachment plate and said bearing reception member being attached to said supporting body by tightening said at least one screw.

8. A clamping mechanism as claimed in claim 6, wherein said bearing reception member is formed of resin and is substantially disk-shaped.

* * * * *